United States Patent [19]

Eagan

[11] 4,102,038

[45] Jul. 25, 1978

[54] METHOD OF ASSEMBLING COLLECTOR ELECTRODE PANELS IN ELECTROSTATIC PRECIPITATORS

[76] Inventor: Robert L. Eagan, 9731 Mansfield St., Oak Lawn, Ill. 60453

[21] Appl. No.: 792,588

[22] Filed: May 2, 1977

[51] Int. Cl.[2] .......... H01S 4/00

[52] U.S. Cl. .......... 29/592 R; 29/462

[58] Field of Search .......... 29/592, 462, 469, 428; 55/112, 113, 148, 143, 145, 154, 156

[56] References Cited

U.S. PATENT DOCUMENTS

| | | | |
|---|---|---|---|
| 2,642,952 | 6/1953 | Landgraf | 29/462 X |
| 3,633,262 | 1/1972 | Vanltuffel | 29/592 |
| 3,729,815 | 5/1973 | Quintilian et al. | 29/592 |
| 3,831,351 | 8/1974 | Gibbs et al. | 29/462 X |

*Primary Examiner*—Victor A. DiPalma
*Attorney, Agent, or Firm*—Emrich, Root, O'Keeffe & Lee

[57] ABSTRACT

A construction process for lifting, assembling and positioning multiple rows of collector electrodes and discharge electrodes in electrostatic precipitators. A mobile crane device is also disclosed which facilitates carrying out the process.

4 Claims, 14 Drawing Figures

FIG. 14
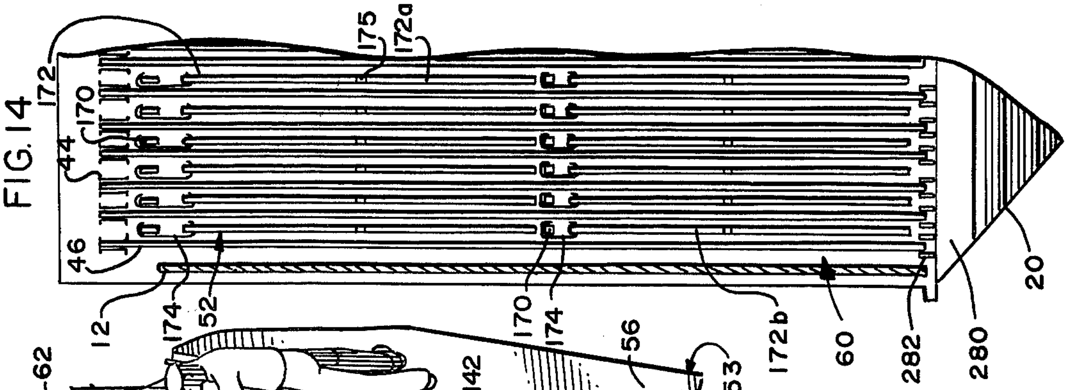
FIG. 11
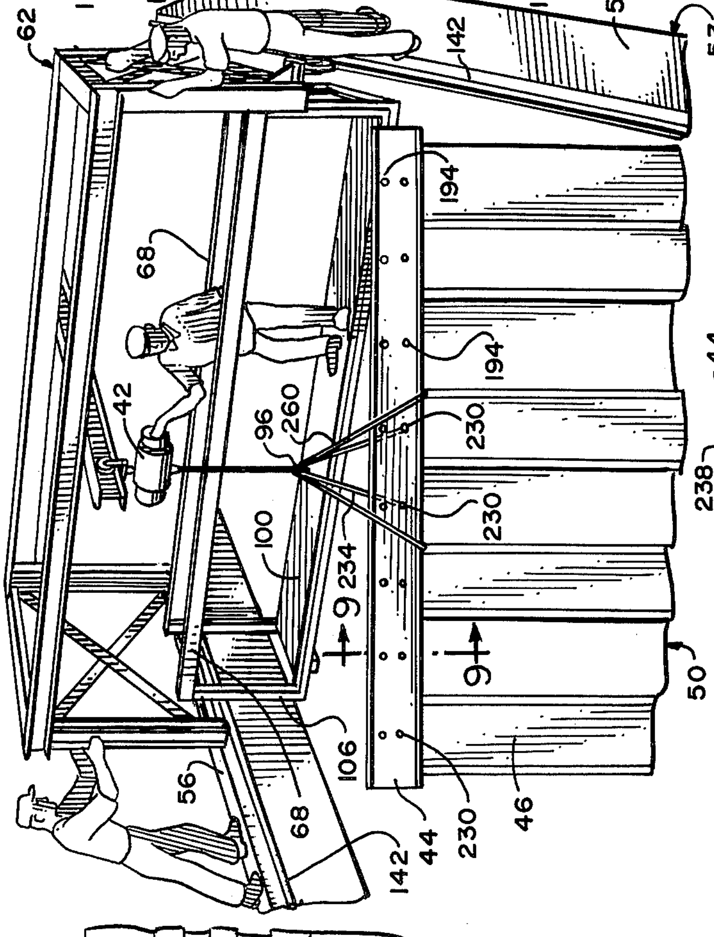
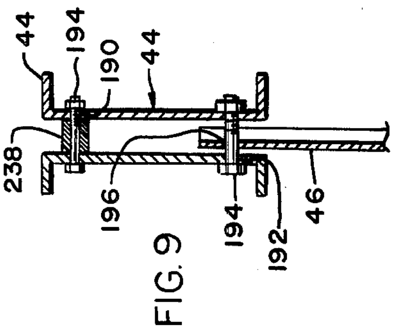
FIG. 9
FIG. 6
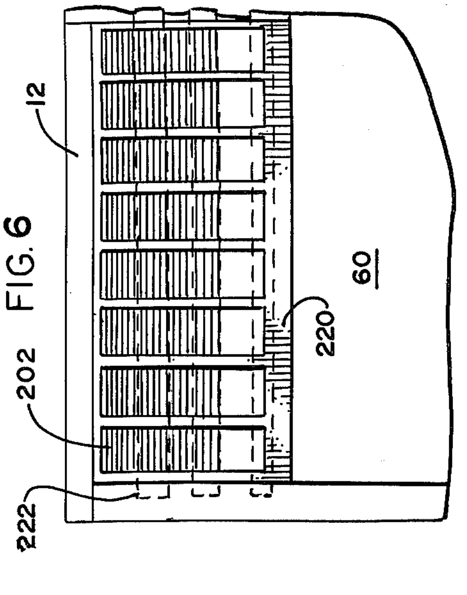
FIG. 8
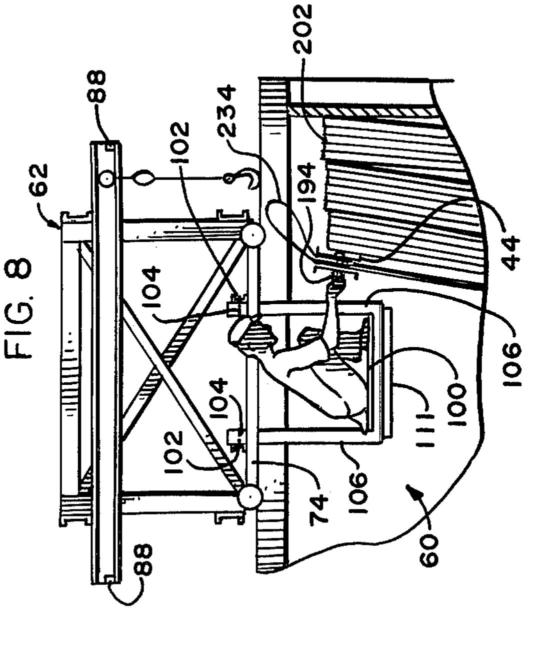

METHOD OF ASSEMBLING COLLECTOR ELECTRODE PANELS IN ELECTROSTATIC PRECIPITATORS

BACKGROUND OF THE INVENTION

Electrostatic precipitators include a modular shell construction containing upright spaced collector electrodes and upright spaced discharge electrodes through which a stream of gas is passed for removal of suspended particles. The collector electrodes are comprised of a series of narrow elongated panel elements held together at their top and bottom ends in side-by-side spaced planar relationship. The discharge electrode assemblies are generally furnished in modular units requiring only to be hung in coplanar relationship between and properly spaced from the collector electrodes. Because of the size, weight and configuration of these electrodes, their assembly and placement within the close confines of the shell of an electrode precipitator requires exceeding care and, consequently, long man hours. For example, there are as many as three-hundred and thirty-six panel elements to be handled, in the installation of the collector electrodes only, for one compartment of a precipitator and each precipitator has at least eight such compartments.

In accordance with U.S. Pat. No. 3,729,815, directed to this assembly problem, a plurality of plates is first bundled, then lifted into the precipitator shell for release from the bundle and the plates are individually installed by hand on their supports. Each individual plate is hoisted to its respective position provided within the shell. This kind of piecemeal installation of the plates is tedious, time consuming and expensive.

In accordance with at least one other prior art method the following procedure is carried out:

The panel elements to be assembled are manually removed from their boxes in the assembly area and piled individually for assembly. The individual panel elements are moved by hand to a position on a horizontal jig frame. After assembling one or more full collector electrodes on the jig frame, it is necessary to transport the jig frame and assembled electrodes from the assembly area to the tower crane location where the jig frame and assembled panels are lifted by the tower crane into the hanging bay of the precipitator. The jig frame is then detached from the assembled panels and lowered to the ground for transport back to the assembly area. The assembled panels now hanging in the precipitator bay must be moved individually to the correct location on their hanging supports. This requires the use of the main hoist, a 150 ton crane, to move the individual electrodes, weighing 1 ton each, from a long boom.

After setting the collector electrodes in nine individual movements, it is necessary to handle the discharge electrode frames using the same 150 ton crane and move the pieces one at a time from ground level to their proper location in the precipitator. Experience has indicated that this prior art assembly method produces about 5 installed electrode panels per week. By the instant method, from 8 to 10 or more electrode panels per day can be assembled and installed inside the precipitator.

SUMMARY OF THE INVENTION

In accordance with the present invention, a construction process and apparatus for the assembling and positioning of collector electrodes and discharge electrodes in electrostatic precipitators is provided. The general steps of the method are as follows:

Bundles of panel elements for the collector electrodes are freed at one end of their steel strapping and part of the framing to expose end holes. A crane hook is attached at location and the bundle is hoisted to a vertical position. The balance of the strapping is cut whereby the wooden framing falls free. The bundle of panel elements is then hoisted up and into the inside of the shell and lowered to a position on a temporary scaffold or floor in the precipitator bay where the top end is above the attaching brackets therefore. Subsequent bundles of panel elements are hoisted and arranged in side-by-side relationship across the shell or bay of the precipitator in which they are to be hung. The required number of rows of such bundles is placed in coordinated array in each section of the precipitator to form the collector electrode assemblies therefore.

A mobile scaffold, disclosed herein, is moved into position to facilitate the assembly of the eight collector element panels into a collector electrode assembly. This is done by placing a support channel on each side at the tops of the front row of vertically stacked panel elements thus separating them from the rest. The support channels are attached on each side of the row by through-bolts, after which the assembled collecting electrode is raised with a one ton chain hoist and either moved to its position at the other end of the precipitator bay or a series of such assemblies is formed, temporarily hung from the hoist frame and then moved into position in the bay. This operation assembles eight panel elements into an assembly per move of about fifteen minutes. Those panel elements which require orientation in order to be properly assembled with their channel openings facing in opposite alternating positions are lifted and turned 180° by a lever hoist provided as part of the invention. The collecting electrode assemblies are moved by the mobile scaffold and hung on the attaching brackets by means of their support channels in spaced, vertical relationship in the bay with their lower ends placed between the guides at the bottom of the bay.

An "A" frame attachment is also provided on the top of the mobile crane to raise the discharge electrode assembiles over the collecting electrode assemblies now in place. The discharge electrode frames are assembled in coplanar sets of four by welding at the work site, two such sets constituting a discharge electrode assembly. The sets of four such discharge electrodes are lifted in multiples from ground level to a rack on the mobile scaffold or hoist. This moves or raises eight frames or more in about 20 minutes. With the eight or more discharge electrode frames on the scaffold, the hoist is moved to the proper position and the frames are placed in the precipitator shell or bay by hanging one set of four frames from an intermediate support beam and a top set from a top support beam. This places one discharge electrode assembly between each of the spaced pairs of collecting electrode assemblies in the series. The mobile hoist operates from rails affixed on top of the insulator compartments that extend in a raised position along the top and side walls of two or more precipitator chambers to provide room for these moving and placement steps.

A BRIEF DESCRIPTION OF THE DRAWINGS

An illustrative embodiment of the invention is shown in the drawings wherein:

FIG. 6 is a top plan view taken along lines 6—6 of FIG. 5 after the required number of bundles has been placed in the bay.

FIG. 8 is a fragmentary view showing the use of the catwalk of the hoist by a workman in the assembly of a plurality of panel elements into a collecting electrode assembly;

FIG. 9 is a cross-sectional view taken along lines 9—9 of FIG. 11;

FIG. 11 is a fragmentary perspective view which can represent either the lifting of a collecting electrode assembly for temporary storage on the mobile hoist or the lifting of one such assembly to its position in the precipitator;

FIG. 14 is a cross-sectional view taken along the lines 13—13 of FIG. 3 showing the ends of an array of collector electrode assemblies and discharge electrode assemblies within the shell of the precipitator.

DESCRIPTION OF THE PREFERRED EMBODIMENTS

Figure 1:
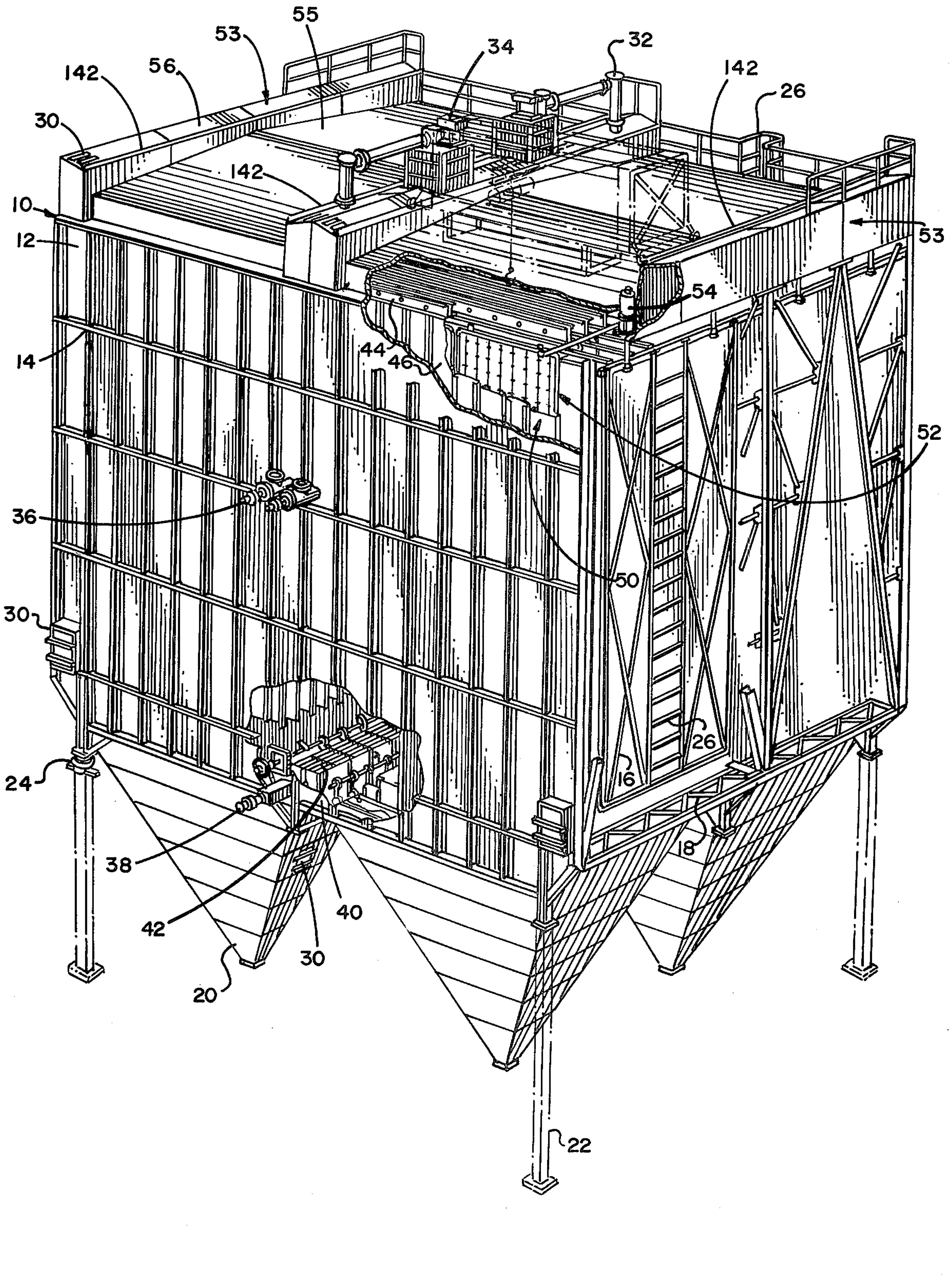
FIG. 1 is a perspective view of one section of an eight bay precipitator with parts cut away in one bay to show the interior structure.

Referring to FIG. 1 there is shown one section of a horizontal flow electrostatic precipitator 10. The side walls comprise a plurality of assembled, modular, shell wall units 12 supported by means of the cross-braced frame structure 14. Removal of parts of the structure exposes one of the stabilizing frame works 16. The gas intake manifold and related equipment would be attached to the outside wall of the adjoining section of the precipitator and the flow of gas would be horizontally through the stabilizing frame works 16 that are between each precipitator bay. A head wall 18 illustrates part of the bracing structure.

At the bottom of the precipitator there is provided a plurality of hoppers 20 from which precipitated materials are periodically removed. The square support legs 22 are attached, one at each corner, by means of the oil immersed load support bearings 24. Suitable external and internal access ladders 26 are located on the precipitator as illustrated. Access doors 30 are conveniently located for the purpose of allowing maintenance personnel to inspect or enter the unit during shut-downs.

FIG. 1 also shows such known functional parts as the HV Bus duct 32, the transformer-rectifier 34, and the discharge electrode rapping drive motors 36, as well as the collecting electrode rapping drive motor 38.

FIG. 1 has been cut away to expose, at the bottom center of this section, the structural member or tunnel 40 and the internal inspection walkway 42. At the top corner the exposed support channels 44 are shown to be attached to the top edges of a plurality of collecting panel elements 46 in their proper relationship to form a collecting electrode assembly 50 with the discharge electrode assemblies 52 as suspended in a bay of the precipitator. This cut-away includes one of the insulator compartments 53 exposing one of a plurality of fused quartz insulators 54 housed therein.

As further illustrated in FIG. 1, the insulator compartments 53 extend in pairs beside the roof sections 55 of the precipitator along the sides of a pair of precipitator bays. The insulator compartments 53 have generally flat top surfaces 56 and advantage is taken of this feature in accordance with this invention, as will be described, in order to gain access to the pairs of precipitator bays 60 (See FIG. 5) which are located under the roof sections 55. In the embodiment of the precipitator chambers or bays 60 in which the arrays of collecting electrodes and discharge electrodes are to be assembled.

Figure 2:
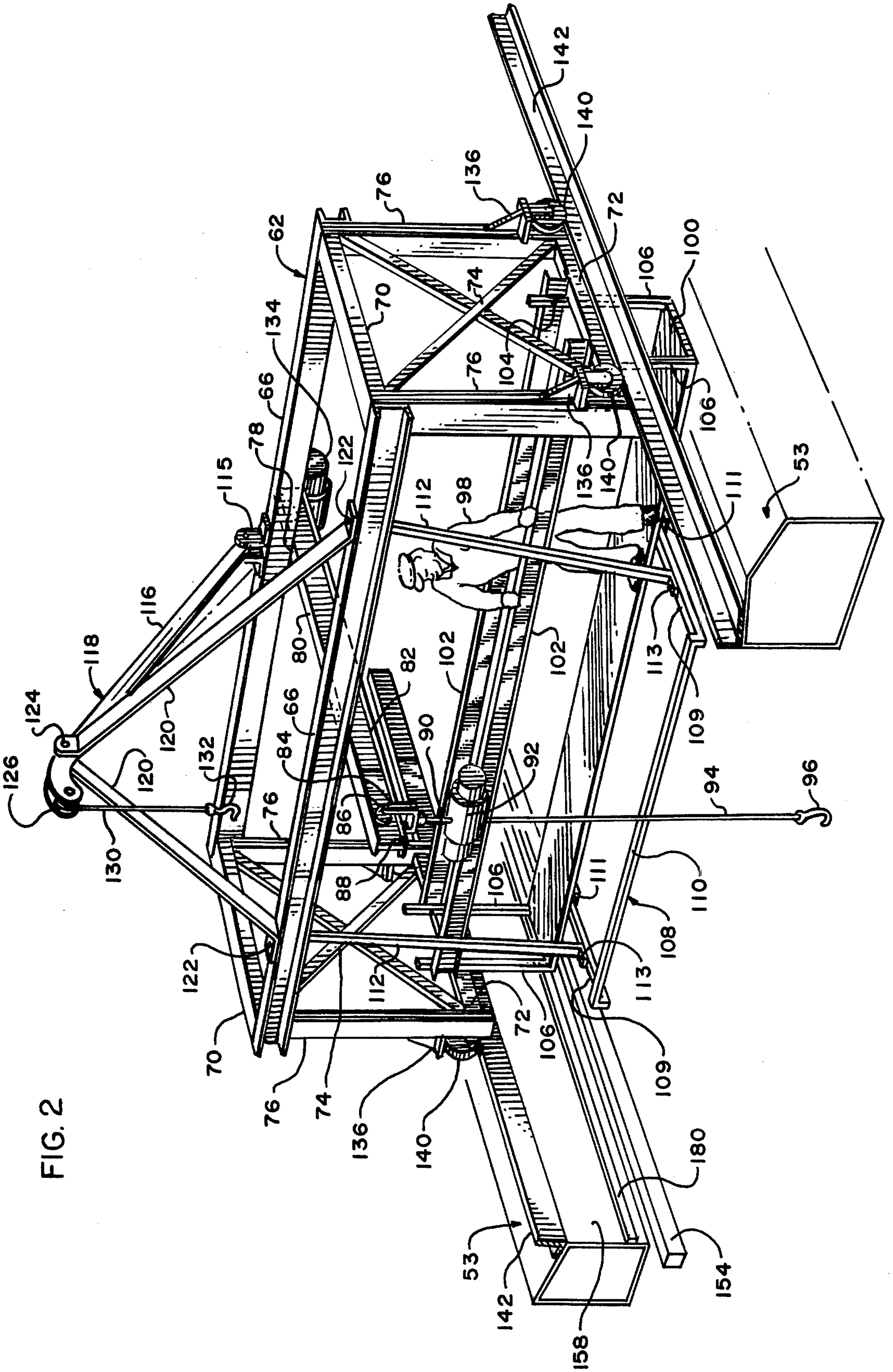
FIG. 2 is a perspective view of the special hoist designed for use in the method of this invention.

FIG. 2 shows the general organization of the parts for the mobile hoist 62 which is an important tool for the process portion of this invention in that it facilitates the movement of the parts of the collecting and discharge electrodes and also the assembly of these parts into the units, as well as the proper placement and hanging of these units into the bays 60 of the precipitator 10.

The hoist 62 has the rectangular open-bottomed frame that includes a pair of spaced, elongated, transverse C-beams 66 at the top. These are tied together by the cross beams 70 at the top and corresponding cross beams 72 at the bottom. Suitable cross-bracing 74 at each end and the four corner uprights 76, attached top and bottom to the foregoing parts, complete the basic open-bottom, inverted C-shaped frame structure with room in which to operate the hoists.

Central of the pair of top cross beams 66 and extending transverse the frame there is attached, as by welding at 78, an I-beam track 80 forming a track by means of its lower flanges 82 on each side for the two-wheeled trolley 84, the wheels 86 of which are freely rotatable to allow the trolley to be moved back and forth the length of the track 80 by hand. Suitable stop members, such as the cleats 88 (See also FIG. 7), are provided to prevent the trolley from going off the end of the track. The track 80 may or may not extend beyond the beams 66 on each side of the frame 62.

The trolley 84 has a U-shaped frame that suspends at its transverse bottom a swiveled rod 90 attached to the hoist motor or winch 92. The hoist motor has the flexible cable 94 and hook 96 that are extended or retracted under the control of the operator indicated at 98. The electrical cable for the winch 92 is omitted for simplicity.

The operator 98 stands on a work platform or catwalk 100, preferably having a non-slip top surface, that is adjustably supported from the pair of transverse support beams 102 by means of the detachable bolts 104

(See also FIG. 7) engaging through the four corner uprights 106 that carry and are welded to the platform 100. The support beams 102 are essentially parallel, spaced wider apart than the uprights 106 and have their ends resting on or welded to the top of the cross beams 74 at each end of the platform. The uprights 106 are spaced longitudinally of the frame so as to pass upwardly in close proximity to the inside surfaces of the beams 72. Thus, the platform 100, if not welded, may hang between the cross members 74 by means of the ends of these support beams 102 and can be removed if desired. The support beams 102 are longer than the span between the end beams 72 so that a solid support is provided on top of the end beams. By these means the platform 100 can be moved or slid transverse the frame 62 so that the operator 98 can have ready access to the space under the frame and on each side over or under the outside beams 66.

The platform also includes an adjustable bracket 108 having a pair of horizontal, longitudinally spaced leg members 108 tied at their extended ends by the cross beam 110 to form a grid support. These parts of the grid support are formed of tubular stock and the legs 108 are slidably mounted to the bottom of the catwalk 100 by means of engagement within the tubular members 111. A pair of braces 112 attach to the bottom beam 66 by means not shown and to the legs 109 by means of the bolts 114 for security when the grid support is in its extended position shown in FIG. 2. With the braces 112 removed the grid support can be moved back from this side of the hoist out of the way or removed entirely.

Figure 13:
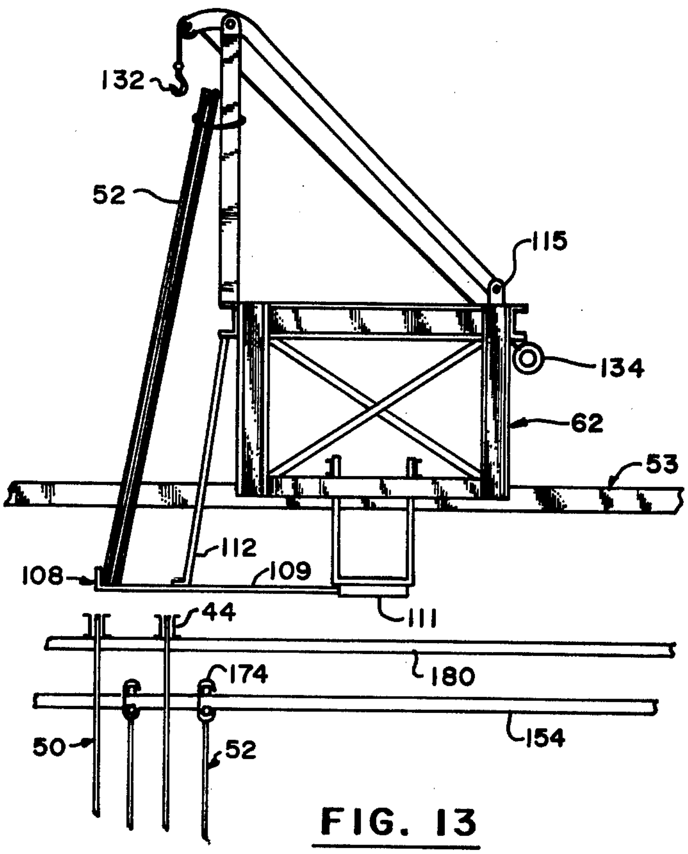
FIG. 13 is an end view of the hoist with a plurality of pre-assembled sets of discharge electrodes stored on a bracket on one side of the hoist.

Assembled groups of discharge electrode assemblies 52 are temporarily stored on the grid support 108 as shown in FIG. 13, to be described, and may be temporarily tied by a cable for safety.

The frame 62 includes the pair of upright cleats 115 at the top on the center of the rear beam 66 defining a detachable mount, through a removable pivot pin to support leg 116 of the tubular "A" frame 118. The pair of legs 120 of the "A" frame 118 is attached to the front beam 66 at the spaced points or bolts 122 and their upper ends join the leg 116 at the bolt 124. The leg 116 extends beyond this juncture to support the pulley 126 at its end that trains the cable 130 having the hook 132 at its working end. The other end of the cable 130 passes to the second hoist motor 134 suitably supported under the end of the track 80.

A pair of side cleats 136 is attached to the outsides of the uprights 76 (on each end of the frame) to provide rotational support for the wheels 140, adapted to transport the hoist 62 along and upon the parallel pair of tracks 142.

Figure 3:
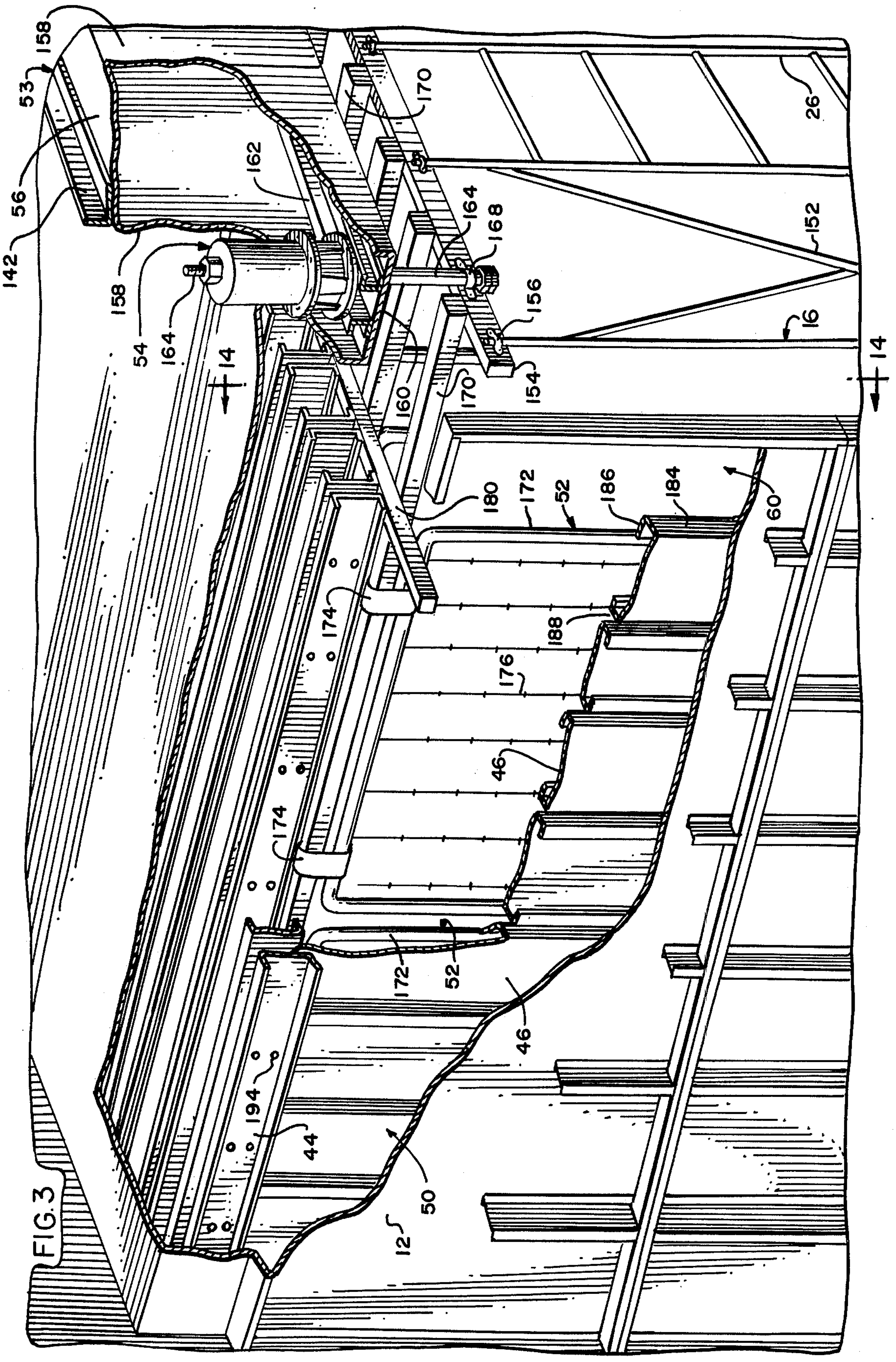
FIG. 3 is an enlarged fragmentary perspective view of one corner of the shell of the precipitator of FIG. 1 showing in better detail the manner in which the collector electrodes and the discharge electrodes are hung in a representative precipitator chamber or bay.

As shown in FIGS. 1, 3 and 8, the tracks 142 are affixed, preferrably by welding, to the top surfaces 56 of a pair of insulator compartments 53 so that the hoist can be conveniently moved from place to place over the precipitator compartments 60.

FIG. 3, being an enlargement of the cut-out corner of FIG. 1, shows the relationship of parts at the completion of the installation of the collecting electrode assemblies 50 comprising a series of eight elongated panel elements 46, and the discharge electrode assemblies 52, comprising four discharge electrode frames (to be described) within a compartment 60. This internal structure includes the stabilizing frame 16 with its trusses 152 forming the side inlet to the compartment or bay 60. This framework is suspended from the quartz insulators 54 by means of a pair of heavy box beams 154 (only one shown) that extend in spaced parallel relationship along the sides of the compartment 60 under the insulator compartment 53. This frame 16 is suitably attached to the beam 154 by means of the U-shaped hold-down brackets 156.

The insulator compartments 53 are enclosed by the top wall 56, the side walls 158 and the bottom wall 160, the latter having a series of spaced openings (not shown) on which there are positioned, in parallel relationship, the small C-beams 162 to provide rigid support for the series of fused quartz support insulators 54 spaced therealong. Each insulator 54 has a central steel rod 164 that extends in insulated relationship therethrough for attachment to the beam 154 by means of the larger brackets 168. Each insulated rod 164 has a top threaded portion to receive an adjusting nut, as illustrated, for leveling the beams 154 and limited height adjustment.

Seated upon or otherwise attached to the pair of beams 154 is the series of transverse, spaced, parallel support beams 170 that provide a hanger for the tubular grid frames 172 of the discharge electrodes 52. The electrodes 52 are hung in transverse pairs from the beams 170 by means of the insulated "C" brackets 174. Adjacent pairs of the frames 172 are welded together top and bottom to form a completed discharge electrode assembly 52. Thus, only two pairs of such brackets 174 is ordinarily necessary to hang a four frame discharge electrode assembly 52 at the top.

As illustrated in FIG. 14, each of the top frames 172 also supports a bottom frame **172*a* of a discharge electrode. A second row of transverse beams or bars 170 coplanar therewith supports the lower assembly of four frames 172*b* from the insulated brackets 174. The weldments or other means of attachment for a group of four frames 172 is indicated at 175. Each beam 170 in the series accordingly carries four grid frames constituting a discharge electrode 52. Depending on the size of the compartments 60, the number of collecting and discharge electrode assemblies to be installed will vary. To illustrate, there may be forty-two collecting electrode assemblies in a compartment. This means that there will be fourty-one spaces for pairs of discharge electrode assemblies 52, each constituting four grid frames 172 for a total of three-hundred and twenty-eight frames 172** per compartment.

The assembly within each of the compartments also includes a pair of topmost longitudinal support beams 180 (FIG. 3, only one shown) that are spaced inside the support beams 154 and are welded to the inside wall 158 of each insulator compartment 53. The beams 180 extend transversely of the series of beams 170 and are spaced inwardly from their ends.

As before stated, the assembly includes the collecting electrode assemblies 50 made up of a series of spaced, individual panel elements 46 that are U-shaped in cross-section, having the side flanges or legs 184 and the inwardly directed flanges 186 for the collection of dust particles held thereto electrostatically after having received an electrostatic charge from passage through the grids 176.

The collecting electrode panels 46 are suspended in longitudinal spaced relationship, the spaces therebetween being shown at 188, from the top support channels 44, same being C-beams placed back-to-back along the top ends of the panel elements 46 and provided with rows of upper and lower matching bore holes 190 and 192 (See FIG. 9) the lowermost of which receive the series of attaching bolts 194 and also engage the holes 196 in the top end of each panel element. A sub-assembly of a series of eight panel elements 46, suspended from the pairs of support channels 44, constitutes a completed collecting electrode assembly 50 and the series starts and ends with one such collecting electrode in a given compartment 60 in a manner known in this art. Each collecting electrode assembly is as long as a pair of discharge assemblies 52.

Figure 4:
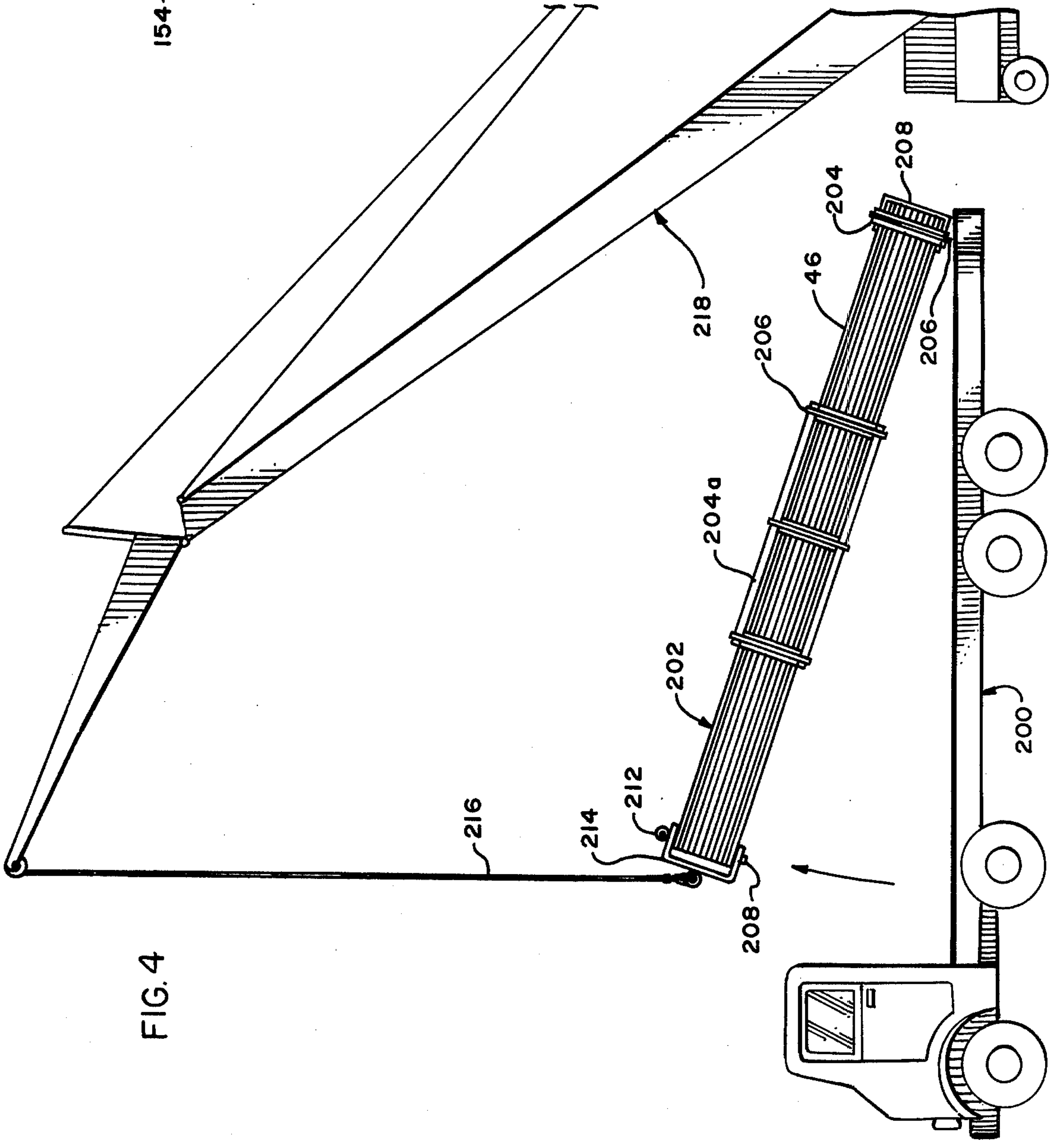
FIG. 4 is a side plan view showing a bundle of panel elements prepared for and being lifted from a flatbed truck in the assembly area.

FIG. 4 illustrates the first step in the method of this invention, wherein, the flatbed truck 200 is shown on location with several bundles 202 of the nested, individual collecting electrode panels 46 thereon. The bundles 202 are generally supplied by the manufacturer with a wooden framing of 2 × 4's, illustrated at 204, on each end, held together by the metal straps 206. The ends of the bundle are protected by a sheet metal piece 208, the ends of which are beneath and held by the wooden frame. Intermediate the ends of the bundle there is generally provided at least one other 2 × 4 frame 204*a*, also held by strapping 206. The panel elements 46 each have bore holes 194 (See FIG. 9) at their top ends and the protective sheet metal, the strapping and the wooden frame are removed so that these holes are exposed.

The heavy bar 208, having a convenient loop end 212 is inserted through suitable holes in the clamp 214 fastened to the end of the lifting cable 216 controlled by the large tower crane 218. The bundle 202 is then lifted from the flatbed truck to a vertical position by means of the crane 218. The general construction power crane at the site is used for this purpose if suitable. Such alternate use of the cranes depends upon the size of the installation.

Figure 5:
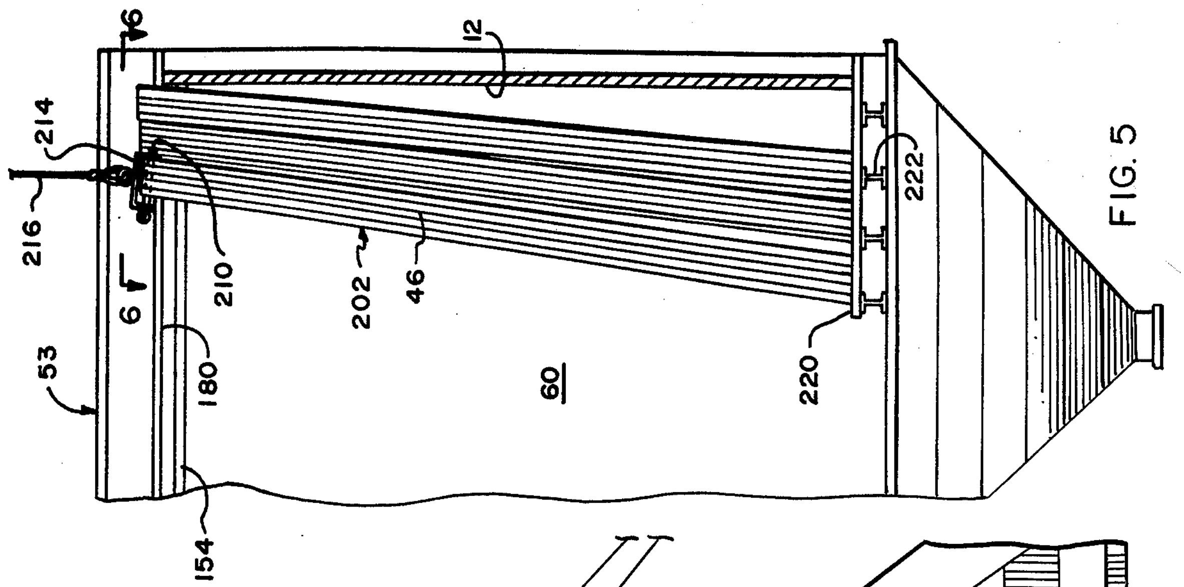
FIG. 5 is a fragmentary view, partially in cross-section, to illustrate the manner in which groups of panels are stacked within a chamber of the precipitator for subsequent assembly.

After the crane has lifted the bundle 202 to a vertical position it is only necessary to cut the remaining straps 206 and all of the framing falls away. The bundles 202, weighing close to a ton, are lifted individually by the crane and lowered into a bay 60, as shown in FIG. 5)

Temporary shoring 220, of two or more layers of 1 inch plywood, is provided in the floor of the compartment 60, supported on the "I" spaced beams 222, for the purpose of supporting the bundles therein. This also provides a lower work platform. After each bundle 202 has been properly placed against the internal wall 12 of the compartment 60, the lifting clamp 214 is removed.

Referring to FIG. 6, the bundles 202 are arranged in eight rows across the compartment 60. As shown in FIG. 11, there are eight individual panels 46 in a single collecting electrode assembly 50. The bundles 202 each containing fourteen panels are arranged three-deep in each row making a total of twenty-four bundles to be lowered into each compartment, or three-hundred and thirty-six panel elements 46 per precipitator compartment. This number may, of course, vary. Depending on the stacking arrangement of the panel elements 46 in the individual bundles, it may be possible to orient each bundle in the chamber 60 so that the individual panel units are arranged in rows of alternate array. As the packing arrangement of panel elements is not uniform, some will have to be turned 180 degrees to assume the position shown in FIG. 3 where the channel side of one panel element faces in one direction and the channel side of the adjacent channel element faces in the opposite direction.

With twenty-four bundles of panel elements in a compartment, the mobile hoist of FIG. 2 is put into operation, after of course having been lifted by the tower crane to the top of the precipitator and properly placed upon the tracks 142.

Thus, with the bundles 202 stacked in rows in a compartment 60 three-deep, as shown in FIG. 6, and with a supply of the support channels 44 and suitable bolts 194, the crane 62 is moved into position so that the workmen can attach the channel members 44 to the single holes 196 in the top end of each panel element, as illustrated in FIG. 9. At the same time, a spacing bolt 194 is inserted in the top holes 190 of back-to-back panels and a spacing collar 238 included so that the panels remain in a spaced parallel relationship.

Figure 7:
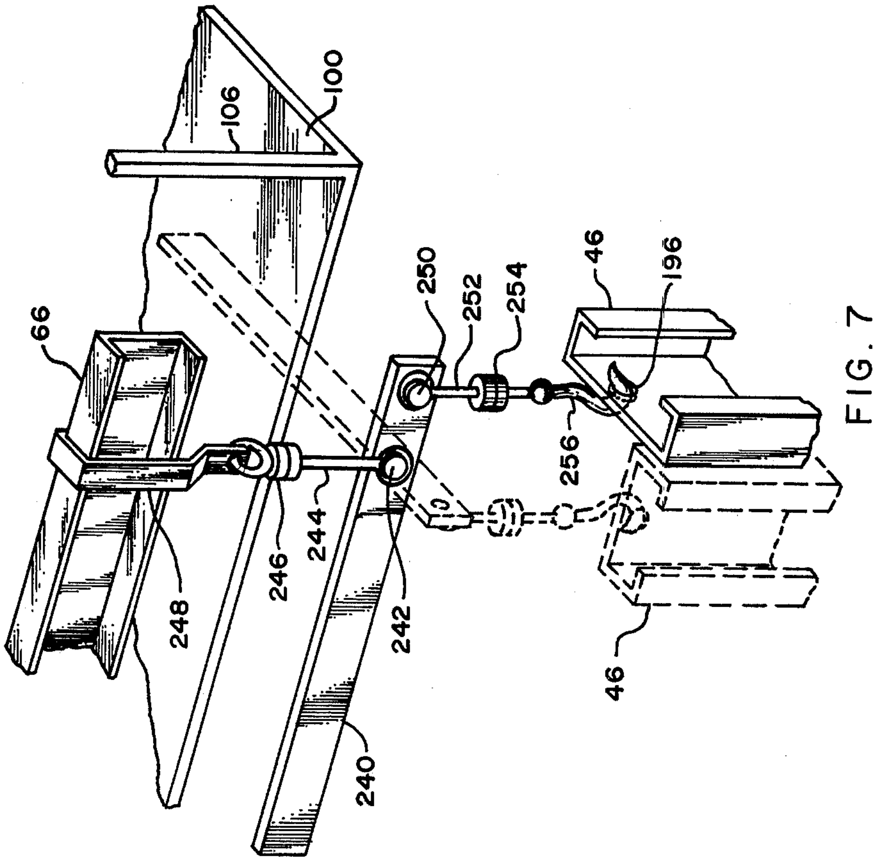
FIG. 7 is a fragmentary view of the special lever hoist used to orient any panel elements from a bundle so that the channel openings can be alternated.
Figure 10:
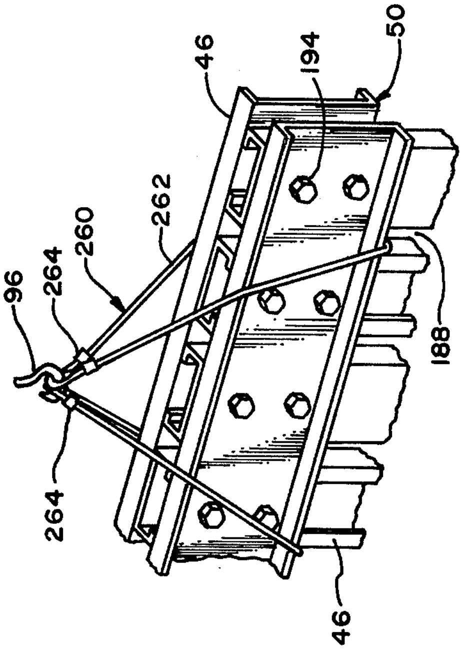
FIG. 10 is a fragmentary perspective view of a collecting electrode assembly and one form of lifting harness therefor.

Referring to FIG. 7 there is shown a lifting lever 240 mounted near one end to a pivot pin 242 attached through the eye of a rod 244 suspended from the swivel 246 suitably attached to the end of the hook 248 that engages over the beam 66 of the mobile hoist. The shorter end of the lever 240 has a second pivot pin 250 suspending the rod 252 having the second swivel 254 intermediate its ends and the hook 256 at the lower end.

It is apparent that the operator standing on the platform 100 can engage the hook 256 in the top hole 196 of a panel element 46 and lift it by the mechanical advantage of the lever so that it can be turned 180 degrees and properly oriented and/or the lever 240 can be swung in an arc about the swivel 246 to further position the panel as desired.

Once a collecting electrode assembly 50 has been assembled, a cable harness 260 is attached by looping through the spaces 188 between the panel elements 46 under the support channels 44 for engagement with the hook 96 of the traveling hoist 92. With the grid support either retracted or removed, the assembly 50 can be moved into its proper position or temporarily stored on the mobile crane as will be described.

Although any type of harness 260 can be used, it is illustrated by the cable 262 having a loop at each end with the bight end of the cable held to itself by means of two or more cable clamps 264. For purposes of temporary storage, several cable loops 266 (See FIG. 12) are provided on the beam 66 of the mobile hoist. As each assembly 50 is lifted and brought near the beam, a U-shaped clevis hanger 268, already attached through the loops 266, is further attached through the loops of the cable harness 260. Release of the hoist 92 allows the hook 96 to be removed.

Figure 12:
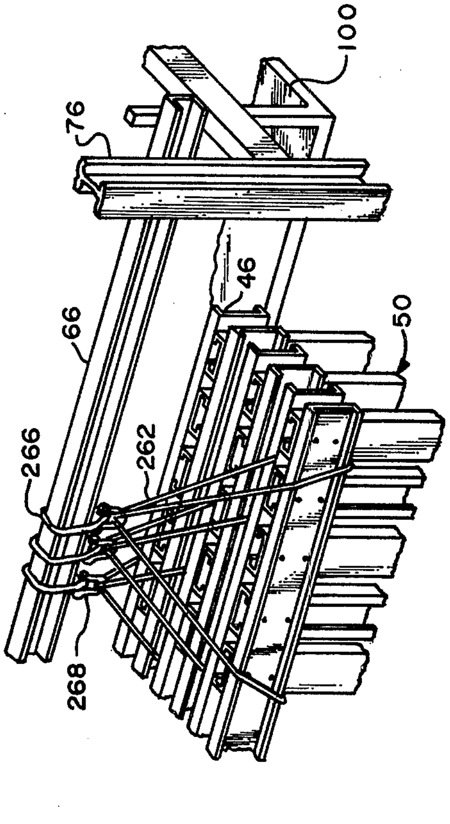
FIG. 12 is a fragmentary perspective view of the manner of attachment of three collecting electrode assemblies to the hoist for transport to position in the bay of the precipitator.

Referring to FIG. 14, it is seen that the bottom 280 of the compartment 60 supports pairs of upright guide elements 282 for each collecting electrode and recalling from FIG. 3 that the bars 170 rest on the side beams 154 while the bars 180 are transverse thereto and welded to the inside wall 158 of the insulator compartments 53, there are alternate steps that can be used to now complete the assembly. With one workman on a raised floor 220 at one end of the compartment, a series of collecting electrode assemblies 52 is moved one at a time, or as a group, as shown in FIG. 12, by manually pushing the mobile scaffold frame 62 to that end of the compartment. Each collecting electrode assembly 52 is raised and carefully placed so that its lower edge engages between the guide elements 282 as the ends of the supports 46 come to rest on the bars 180. These steps are continued until all of the collecting electrode assemblies are in place.

Next, the grid support 108 is attached to the crane with its legs 109 in the tubes 111, the braces 112 are attached if desired, and a plurality of welded discharge electrode assemblies 52 (four grid frames 172 per unit as previously described) are hoisted by means of the "A" frame hoist 118 to the grid platform 108, as shown in FIG. 13. The mobile scaffold is pushed to a position over the space between a pair of collecting electrodes, and lowered to the bottom. A lower cross bar 170 is installed and the lower hooks 174 engaged as shown in FIG. 14, the spacing between the series of collecting electrode assemblies being adequate for this purpose. Then, the top discharge electrode assembly for that space is hung after placement of its cross bar 170 on the top insulated bar 154. During these steps the catwalk 100 of the mobile scaffold clears the tops of the supports 44.

An important consideration of this invention is that after the bundles 202 are placed on the temporary floor 220 in a bay of the precipitator the remaining steps of the installation can be accomplished by two workmen, aided by the specially constructed scaffold or mobile gantry crane with an average of about 2⅓ man hours per assembled collecting electrode assembly, as contrasted with the prior art piecemeal methods requiring a crew of ten men and the operation of the more expensive tower crane full time, the average time per collecting electrode assembly being about 14½ man hours.

What is claimed is:

1. A method of installing collecting electrode plates in an electrostatic precipitator comprising:

opening one end of a framed, stacked bundle of said plates to expose the mounting bore holes;

attaching a hoisting means to said bore holes and raising the bundle to a substantially vertical position to release the remaining framing;

raising and supporting said feed bundle in a chamber of said precipitator;

arranging said freed plates in the required array and in a substantially coplanar relationship within said chamber to form an assembled collecting electrode assembly;

attaching the top support beams to said array of plates; and moving said collecting electrode assembly from said support to an operating position in said precipitator chamber.

2. The method in accordance with claim 1 including the steps of:

continuing to open, raise and support a plurality of said bundles in said chamber of said precipitator;

arranging said freed bundles in parallel rows until the required number of plates are accumulated therein for forming the assembled collecting electrode assemblies for that chamber;

attaching the top support beams to said arranged rows of said freed plates to sequentially form collecting electode assemblies therefrom; and moving said collecting electrode assemblies in series from said support to an operating position in said precipitator chamber.

3. The method in accordance with claim 2 including the step of:

moving said collecting electrode assemblies in groups from said support for installation in operating position in said precipitator chamber.

4. The method in accordance with claim 2 including the steps of:

assembling groups of discharge electrode frames into discharge electrode assemblies; and moving said discharge electrode assemblies to their respective operating positions between said collecting electrode assemblies.

* * * * *

UNITED STATES PATENT AND TRADEMARK OFFICE

CERTIFICATE OF CORRECTION

PATENT NO. : 4,102,038

DATED : July 25, 1978

INVENTOR(S) : Robert L. Eagan

It is certified that error appears in the above-identified patent and that said Letters Patent are hereby corrected as shown below:

Col. 9, line 35: change "feed" to --freed--.

Signed and Sealed this

*Twenty-seventh* Day of *March 1979*

[SEAL]

*Attest:*

RUTH C. MASON
*Attesting Officer*

DONALD W. BANNER
*Commissioner of Patents and Trademarks*